US012791173B2

(12) United States Patent
Sperling et al.

(10) Patent No.: US 12,791,173 B2
(45) Date of Patent: Nov. 10, 2026

(54) RECESSED LED DOWNLIGHT WITH SURFACE MOUNT INSTALLATION ON A JUNCTION BOX

(71) Applicants: Zhongshan Xingyao Lighting Co., Ltd., Zhongshan City (CN); Nathan Joseph Sperling, City of Industry, CA (US); Jacob Sperling, City of Industry, CA (US)

(72) Inventors: Nathan Joseph Sperling, City of Industry, CA (US); Jacob Sperling, City of Industry, CA (US); Dongdong Li, Zhongshan (CN)

(73) Assignee: MAXIM LIGHTING INTERNATIONAL, INC., City of Industry (CA)

( * ) Notice: Subject to any disclaimer, the term of this patent is extended or adjusted under 35 U.S.C. 154(b) by 0 days.

(21) Appl. No.: 18/813,824

(22) Filed: Aug. 23, 2024

(65) Prior Publication Data

US 2025/0327563 A1 Oct. 23, 2025

(30) Foreign Application Priority Data

Apr. 18, 2024 (CN) ......................... 202420816239.5
Apr. 18, 2024 (CN) ......................... 202420816269.6

(51) Int. Cl.

| | |
|---|---|
| ***F21V 21/04*** | (2006.01) |
| ***F21S 8/02*** | (2006.01) |
| ***F21V 15/01*** | (2006.01) |
| ***F21V 17/06*** | (2006.01) |
| ***F21V 17/16*** | (2006.01) |
| ***F21V 19/00*** | (2006.01) |
| ***F21Y 115/10*** | (2016.01) |
| ***H02G 3/20*** | (2006.01) |

(52) U.S. Cl.

CPC .............. *F21V 21/04* (2013.01); *F21S 8/026* (2013.01); *F21V 15/01* (2013.01); *F21V 17/06* (2013.01); *F21V 17/162* (2013.01); *F21V 19/001* (2013.01); *H02G 3/20* (2013.01); *F21Y 2115/10* (2016.08)

(58) Field of Classification Search

CPC .......... F21V 21/04; F21V 15/01; F21V 17/06; F21V 17/162; F21V 19/001; F21S 8/026; H02G 3/20; F21Y 2115/10

See application file for complete search history.

(56) References Cited

U.S. PATENT DOCUMENTS 4,450,512 A * 5/1984 Kristofek .................. F21S 8/02 362/147
7,909,487 B1 * 3/2011 Venetucci ............... F21V 21/04 362/147

(Continued)

*Primary Examiner* — Tsion Tumebo
(74) *Attorney, Agent, or Firm* — Loeb & Loeb LLP

(57) ABSTRACT

A recessed LED downlight with surface mount installation on a junction box may comprise a light housing, a light engine housing, and a trim plate. The light housing may be a hat shape and comprise a brim portion and a hat body portion. The light engine housing may be installed inside the hat body portion. The brim portion may include fitting holes that are sized to receive one or more fixing members for connection with the junction box. The trim plate may be installed to the light housing in a removable manner, and the trim plate may cover the brim portion to shield the fitting holes.

7 Claims, 16 Drawing Sheets

(56) References Cited

U.S. PATENT DOCUMENTS

| | | | | |
|---|---|---|---|---|
| 9,057,505 | B2 * | 6/2015 | Liu | F21V 17/002 |
| 9,618,195 | B2 * | 4/2017 | O'Brien-Bernini | F21V 17/105 |
| 10,584,858 | B1 * | 3/2020 | Boulanger | F21K 9/20 |
| 10,704,771 | B2 * | 7/2020 | Schubert | F21V 21/04 |
| 10,753,558 | B2 * | 8/2020 | Danesh | F21V 21/048 |
| 2012/0243237 | A1 * | 9/2012 | Toda | F21S 8/026 362/306 |
| 2022/0082233 | A1 * | 3/2022 | Kopitzke | F21V 17/164 |

* cited by examiner

RECESSED LED DOWNLIGHT WITH SURFACE MOUNT INSTALLATION ON A JUNCTION BOX

CROSS-REFERENCE TO RELATED APPLICATIONS

The present application claims priority from Chinese Patent Application 202420816239.5, entitled "LED DOWNLIGHT SUITABLE FOR INSTALLATION IN A FIREPROOF JUNCTION BOX," and submitted to the Patent Office of the China National Intellectual Property Administration on Apr. 18, 2024, and also claims priority from Chinese Patent Application 202420816269.6, entitled "LIGHT ENGINE HOUSING FOR AN LED DOWNLIGHT AND AN LED DOWNLIGHT USING THE SAME," and submitted to the Patent Office of the China National Intellectual Property Administration on Apr. 18, 2024, the entire disclosures of which are hereby incorporated by reference herein.

TECHNICAL FIELD

The present application relates to a downlight and, in particular, to an LED downlight suitable for installation in a junction box.

BACKGROUND

A surface-mounted LED downlight typically comprises a light housing, and an LED engine and engine housing. Fireproof installation of LED downlights typically requires a fireproof housing for an LED downlight, which can be costly and require planning at the framing stage of construction. Most electrical junction boxes meet requirements of fire-rated assemblies, but are not sized for LED downlights. While compatible recessed housings may be employed with LED downlights, their use requires planning, coordination, and extra cost in new construction applications. Thus, surface-mounting is typically employed for LED downlights rather than costly recessed housings.

SUMMARY

An LED downlight may be suitable for installation in a junction box, comprising a light housing, a light engine housing, and a trim plate. The embodiments described herein achieve a recessed appearance with a surface-mounted installation. An LED light engine housing may fit within a standard junction box and eliminate the need for a recessed housing. A secondary advancement to the embodiments is applications that meet fire-rated assemblies without custom recessed housings for the LED downlight. The surface-mounted installation of the embodiments achieves a recessed design that is compatible with conventional junction boxes widely available and at a much lower cost. For Chicago plenum applications, an accessory mounting plate may include hole spacing to match a 4-0 junction box.

The light housing 10 is of a hat shape and comprises a brim portion and a hat body portion, and the LED light engine housing may be installed inside the hat body portion. The brim portion may include fitting holes that are sized to receive fixing members (e.g., screws) for connection with the junction box. The trim plate may be installed to the light housing 10 in a removable manner. The trim plate covers the brim portion to shield the fitting holes.

By providing the fitting hole on the brim portion, the embodiments facilitate the cooperation with the installation of a junction box. Embodiments may also hide the fitting holes by using the trim plate to shield the fitting holes after the installation of the light housing 10 with the junction box.

BRIEF DESCRIPTION OF THE ACCOMPANYING DRAWINGS

Figure 3:
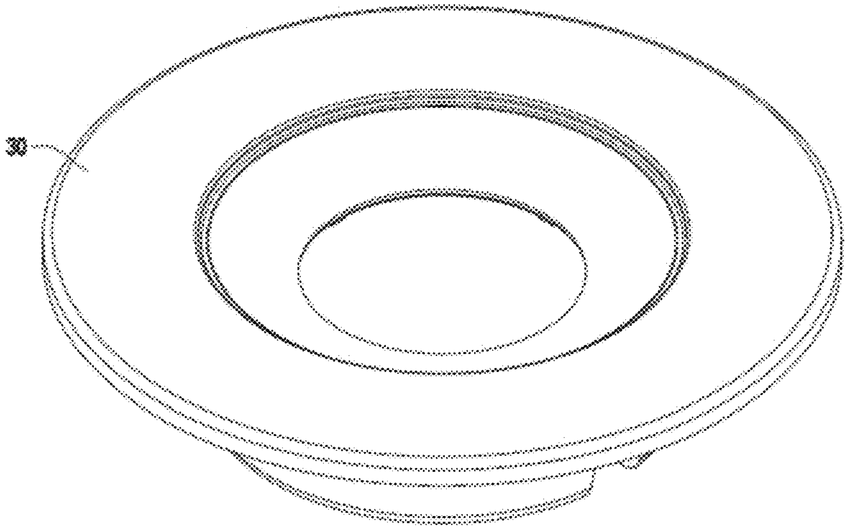
Figure 4:
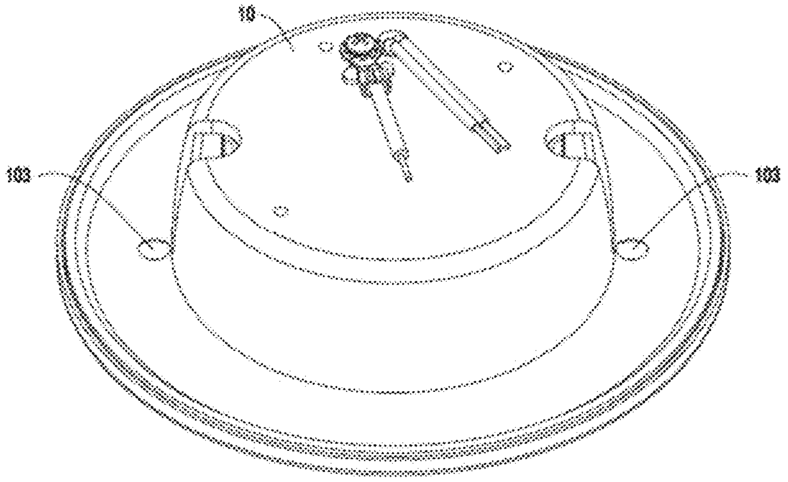
Figure 5:
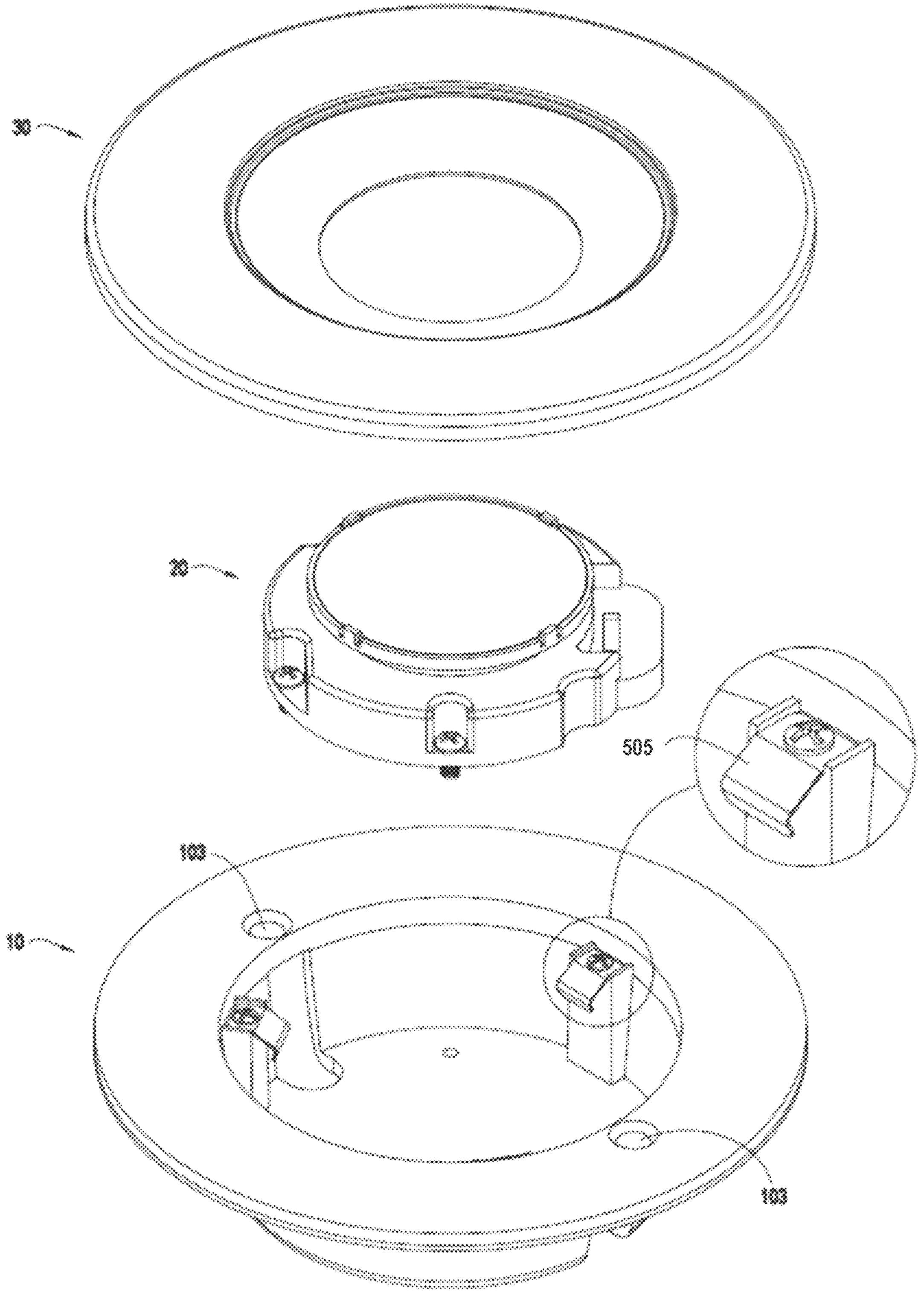
Figure 6:
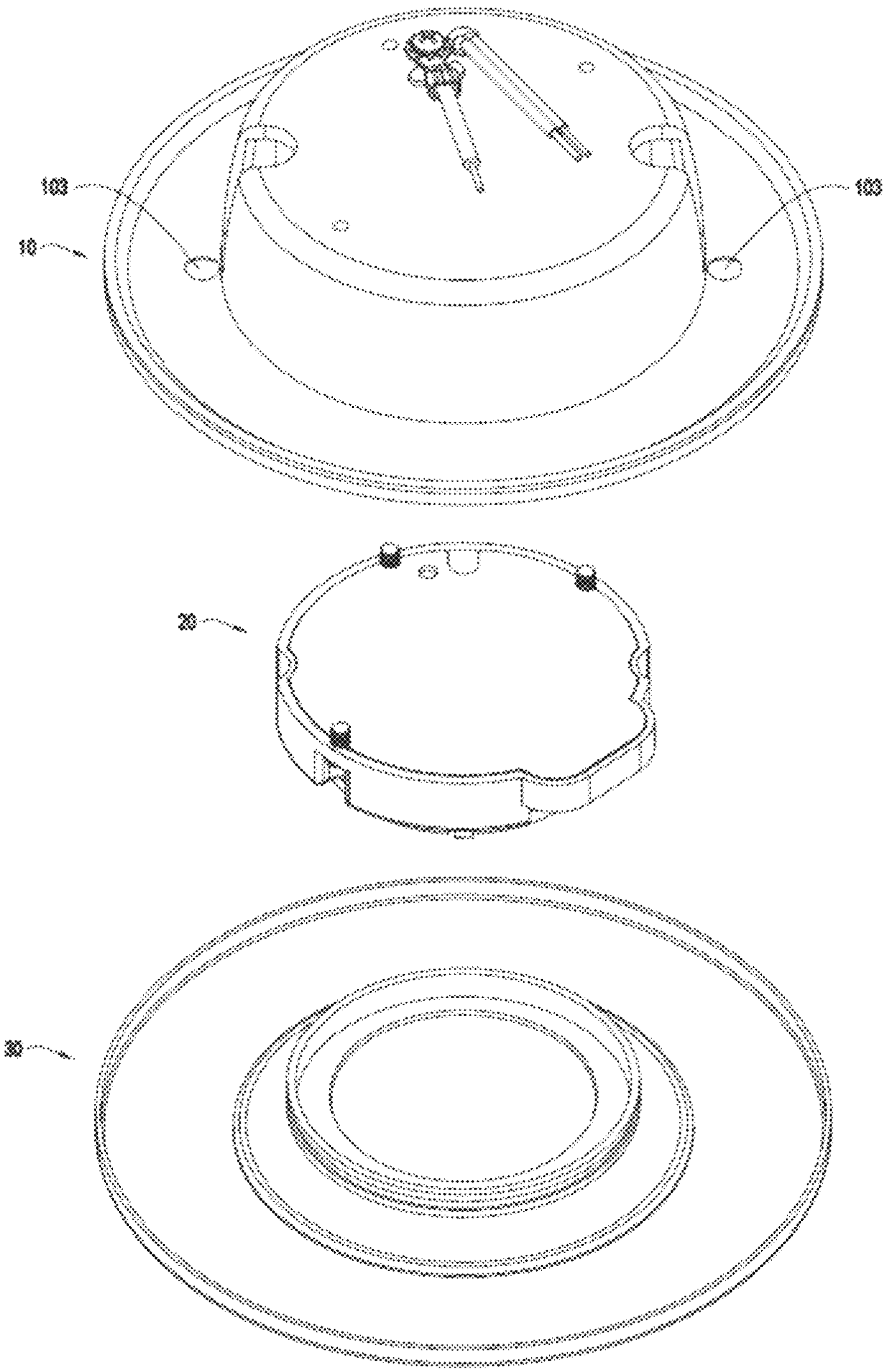
Figure 7:
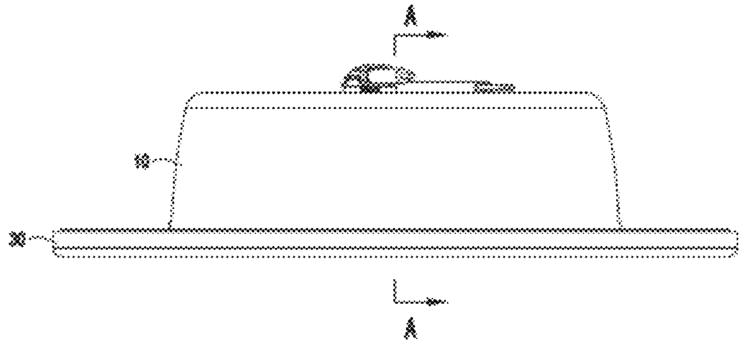
Figure 8:
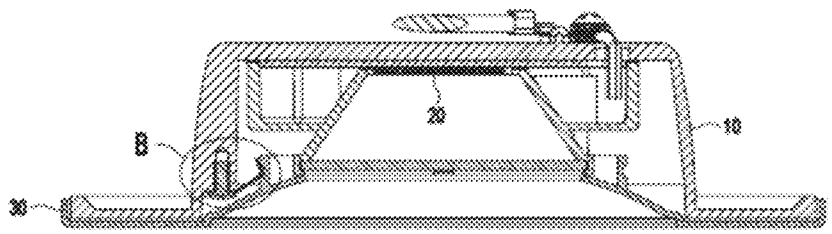
Figure 9:
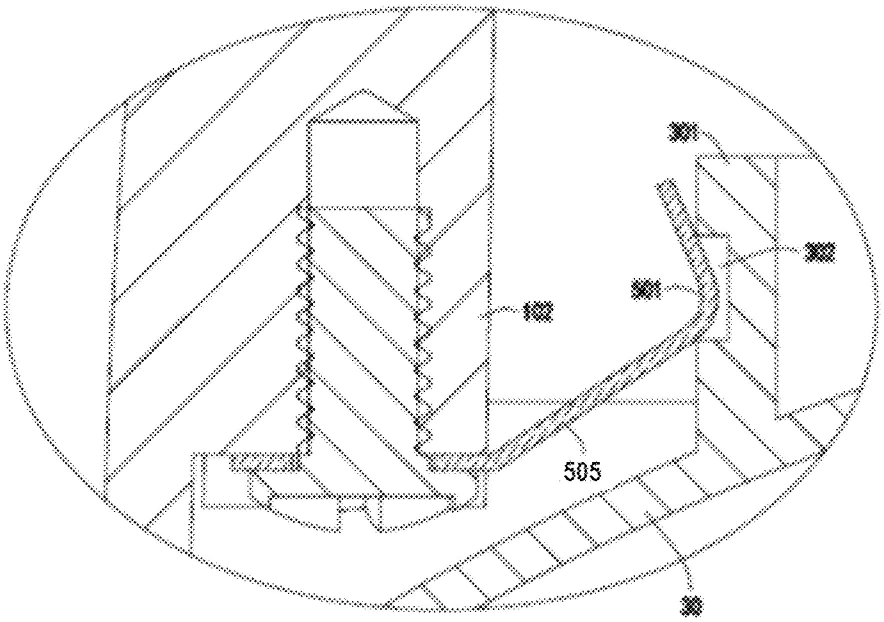
Figure 10:
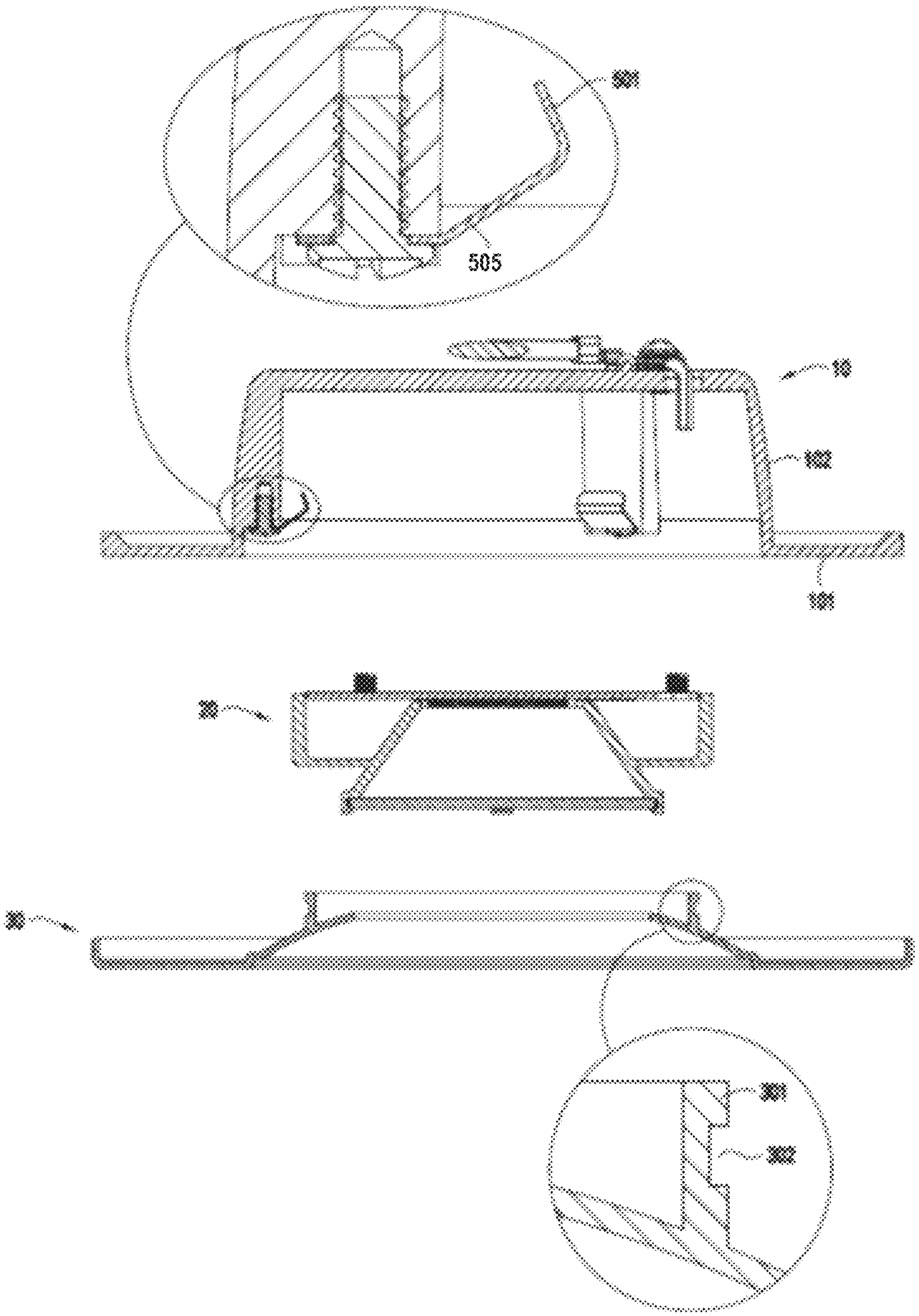
Figure 11:
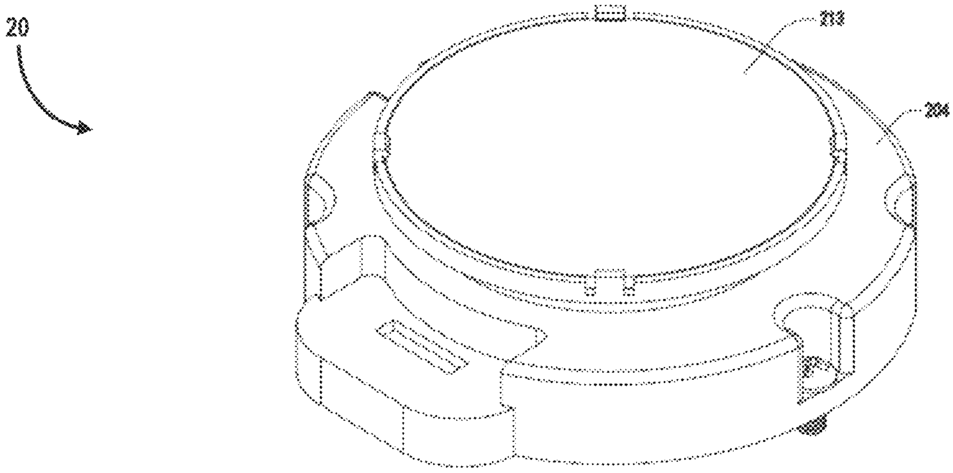
Figure 12:
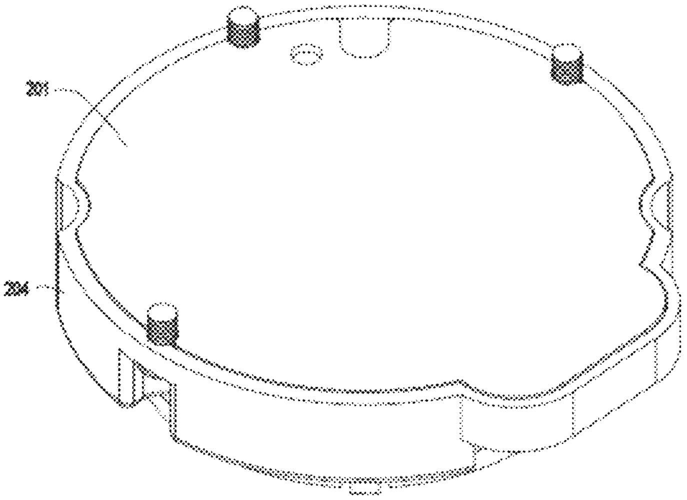
Figure 13:
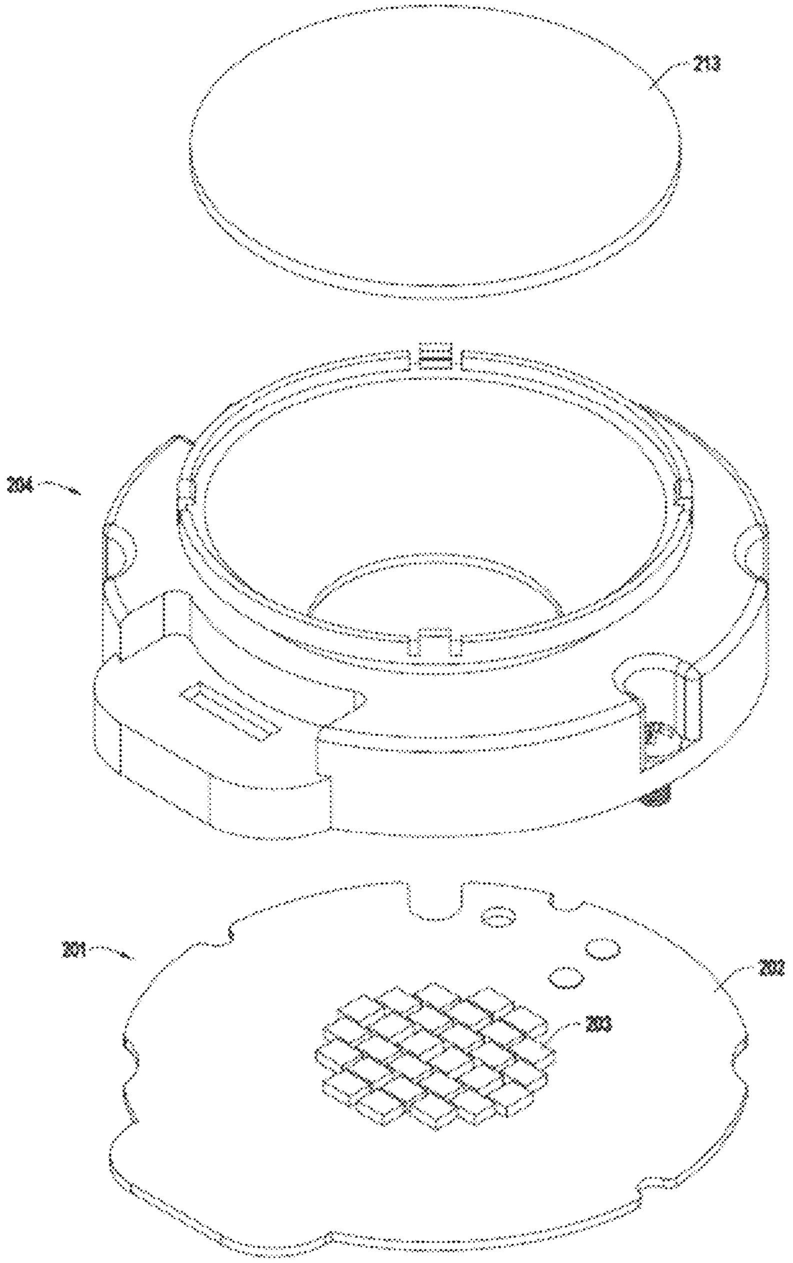
Figure 14:
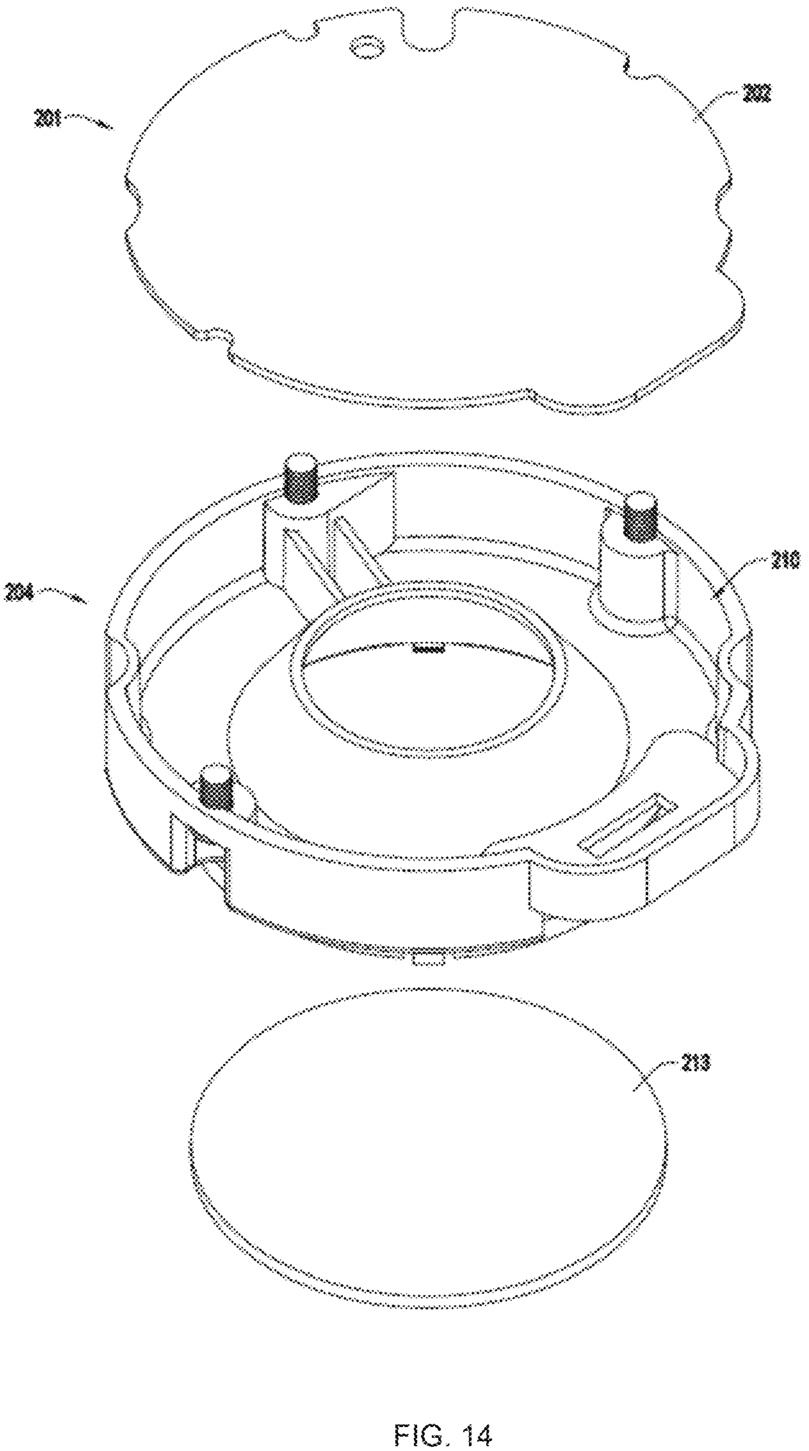
Figure 15:
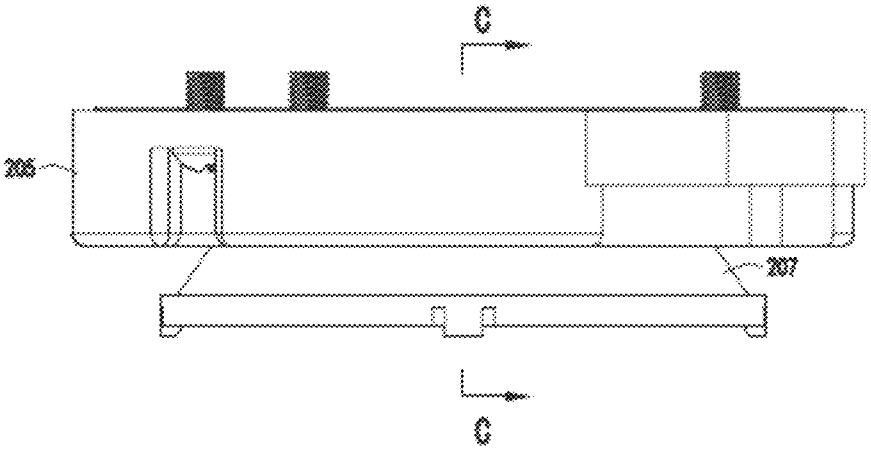
Figure 16:
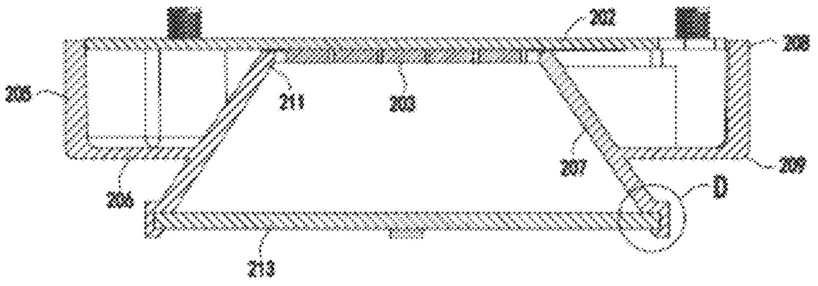
Figure 17:
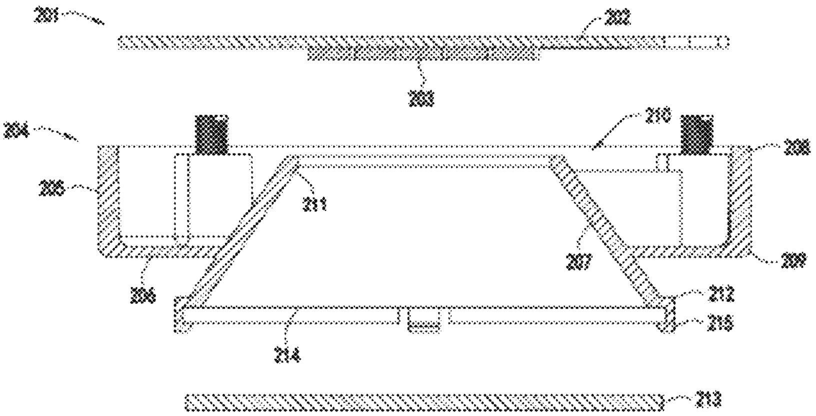
Figure 18:
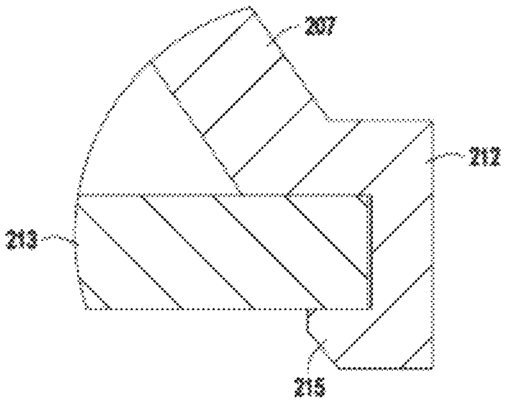
Figure 19:
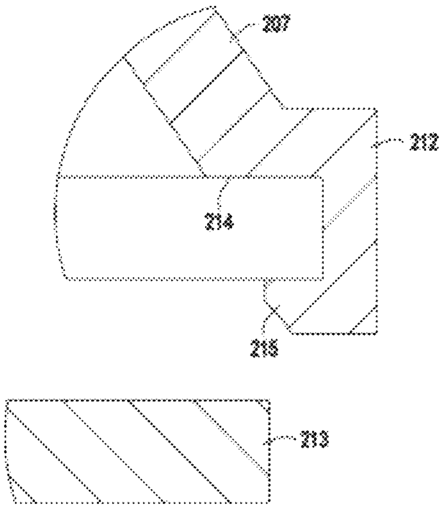
Figure 20:
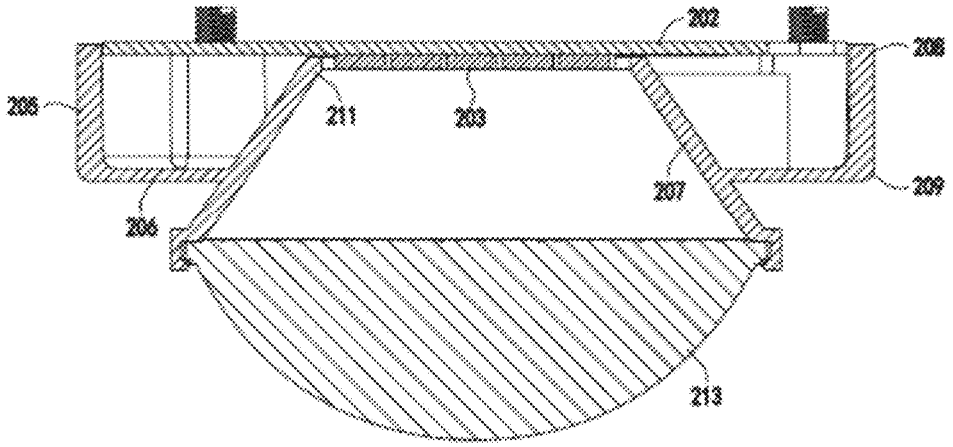
Figure 21:
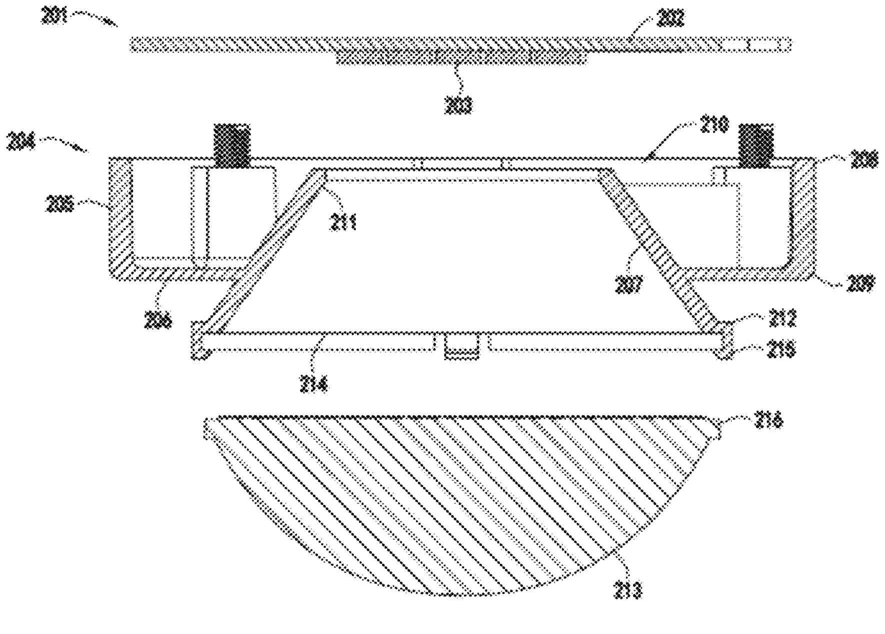
Figure 22:
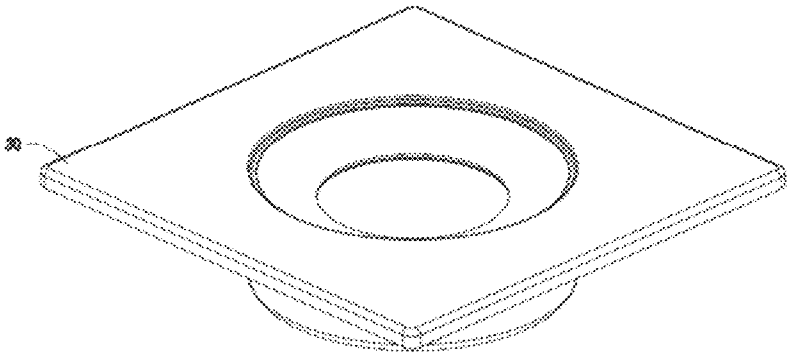

FIGS. 2A, 2B, 20, 2D, 2E, 2F, 2G, 2H, and 2I illustrate a view of the present embodiments while being assembled into a junction box;

FIG. 3 and FIG. 4 respectively illustrate 3D views of the present embodiments from two different perspectives;

FIG. 5 and FIG. 6 respectively illustrate 3D exploded views of the present embodiments from two different perspectives;

FIG. 7 illustrates the main view of the present embodiments;

FIG. 8 illustrates the A-A cross-sectional view of FIG. 7;

FIG. 9 illustrates a partially enlarged view of part B of FIG. 8;

FIG. 10 illustrates a view of separating the light housing, the light engine housing, and the trim plate on the basis of FIG. 8;

FIG. 11 and FIG. 12 respectively illustrate 3D views of the light engine housing according to the present embodiments from two different perspectives;

FIG. 13 and FIG. 14 respectively illustrate 3D exploded views of the light engine housing according to the present embodiments from two different perspectives;

FIG. 15 illustrates the main view of the light engine housing according to the present embodiments;

FIG. 16 illustrates the C-C cross-sectional view of FIG. 15;

FIG. 17 illustrates a view of separating the light-emitting member, the lampshade, and the light distribution member on the basis of FIG. 16;

FIG. 18 illustrates a partially enlarged view of part D of FIG. 16;

FIG. 19 illustrates a view of separating the light distribution member from the large-diameter end of the reflective cup on the basis of FIG. 18;

FIG. 20 illustrates a view of replacing the translucent panel with a lens on the basis of FIG. 16;

FIG. 21 illustrates a view of separating the light-emitting member, the lampshade, and the light distribution member on the basis of FIG. 20; and FIG. 22 illustrates a view of replacing the round cover with a square cover on the basis of FIG. 3.

DETAILED DESCRIPTION

The solution of the present application is further described below with reference to the accompanying drawings.

With reference to the accompanying figures, an LED downlight 50 may be suitable for installation in a junction box. The downlight 50 may include several sub-components such as a light housing 10, a light engine housing 20, and a trim plate 30. The light housing 10 is of a hat shape and comprises a brim portion 101 and a hat body portion 102 that can be placed inside a junction box 40. The light engine housing 20 is installed inside the hat body portion 102. The brim portion 101 is provided with light housing fitting holes 103 for fasteners 402 (e.g., threaded portions of screws) used for fixed connection with the junction box and surface-mounted assemblies to a junction box. The trim plate 30 is installed to the light housing 10 in a removable manner, and the trim plate 30 covers the brim portion 101 to shield the fitting holes 103.

By providing the fitting hole 103 on the brim portion, the housing 10 may be installed to a conventional junction box. Further, by using the trim plate to shield the fitting holes after the installation of the light housing with the junction box is completed, the embodiments conceal the fitting holes.

Figure 1:
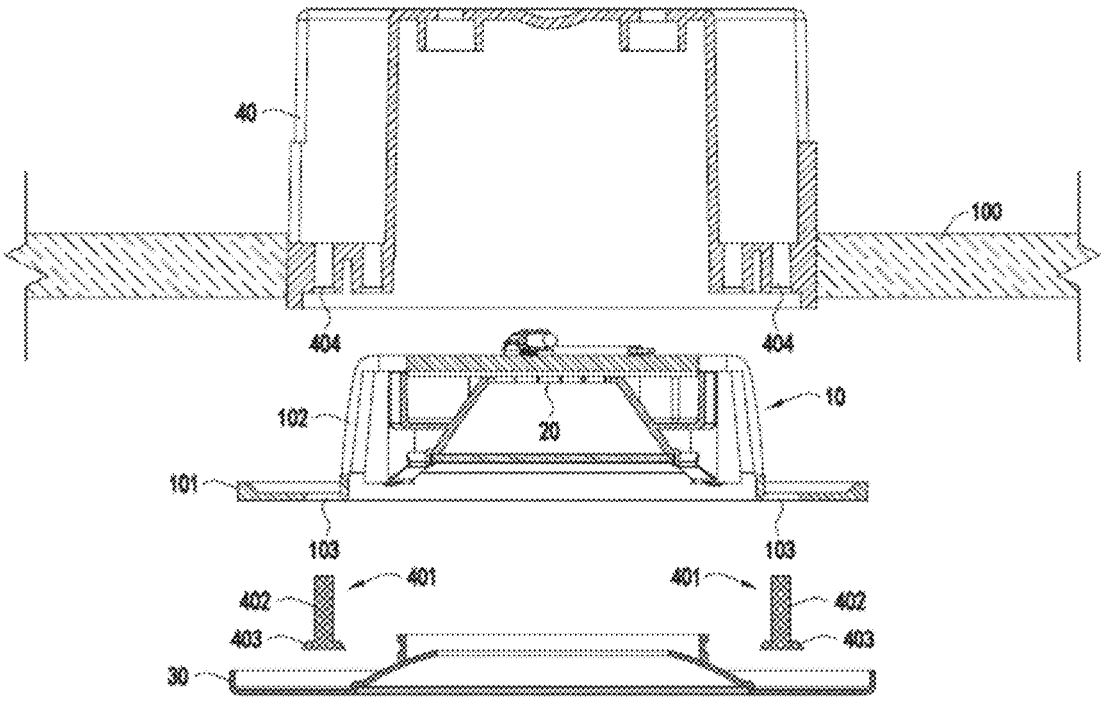
FIG. 1 illustrates a view of the present embodiments before being assembled into a junction box.
Figure 2:
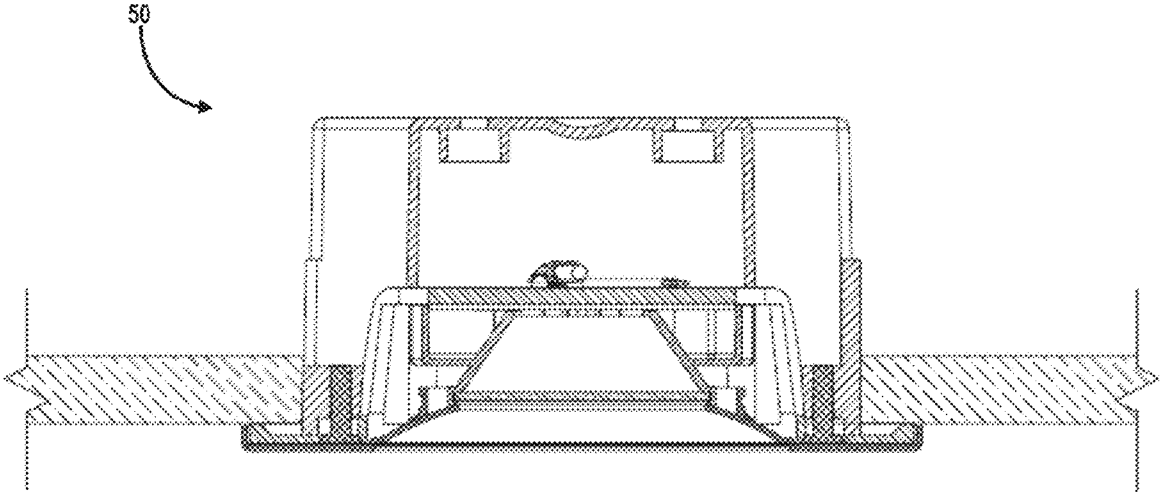
FIG. 2 illustrates a view of the present embodiments after being assembled into a junction box.

In the present embodiments, there are two fitting holes 103 on the brim portion, and these two fitting holes 103 are separately provided on two sides of the hat body portion 102. As shown in FIG. 1 and FIG. 2, the junction box 40 is installed inside the ceiling 100, and two junction box fitting holes 404 for fasteners 401 to secure the downlight 50 to the junction box 40. The downlight 50 may also be configured to select a correlated color temperature (CCT) output for the LED chip array 203.

Figure 2A:
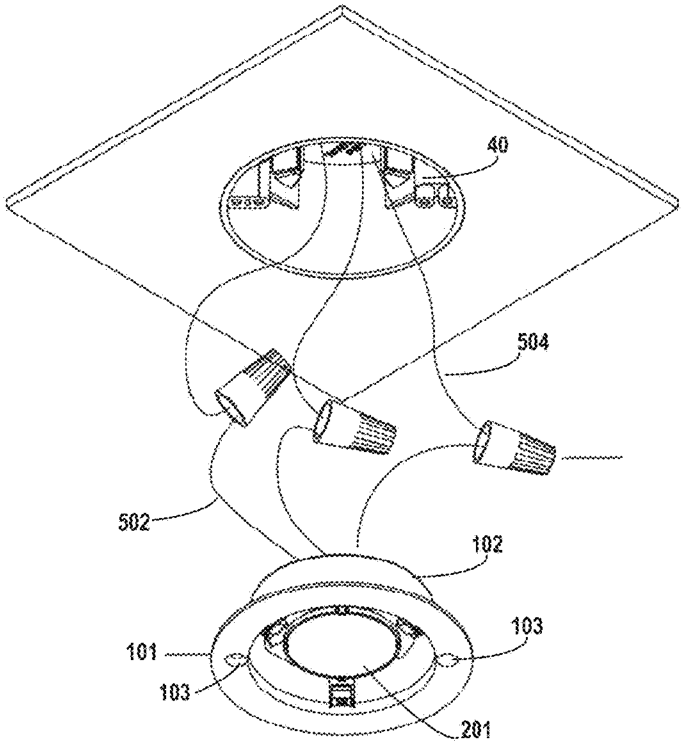
Figure 2B:
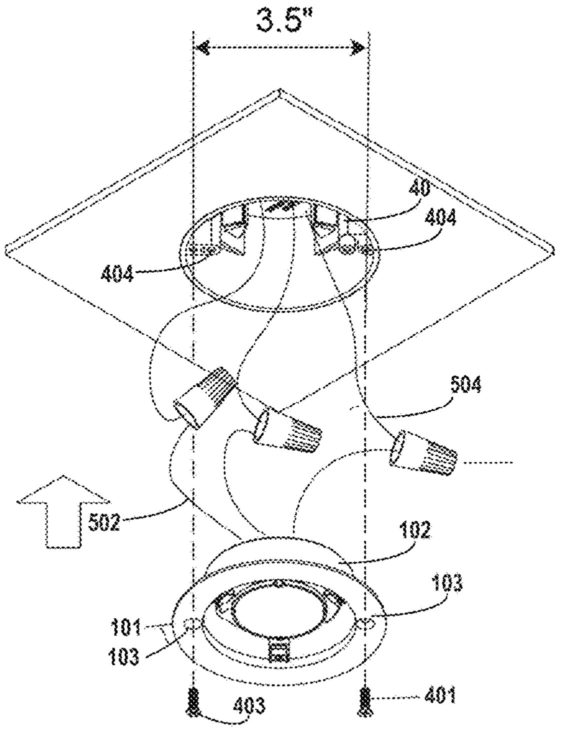
Figure 2C:
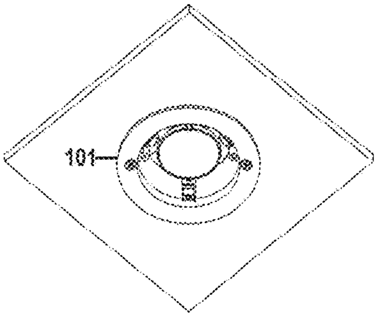
Figure 2D:
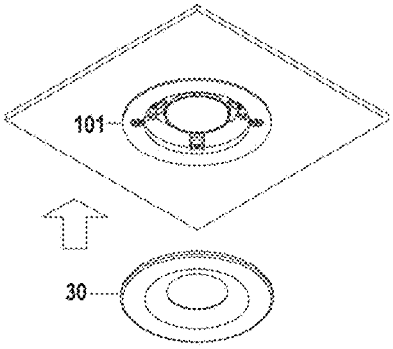

The method for assembling the downlight 50 includes several ordered steps. First, as shown in FIG. 2A, electric wires 502 of the light emitting member 201 may be connected with electric wires 504 in the junction box 40. Then, as shown in FIGS. 2B and 2C, the hat body portion 102 of the light housing may be placed into the junction box 40. Fitting holes 103 of the brim portion 101 may respectively correspond to or align with the position of fitting holes 404 in the junction box. In embodiments that employ screws for fasteners 401, each junction box fitting hole 404 may receive one screw 401, and the rod 402 of each screw may run through the fitting hole 103. Fasteners 401 (screws) may be screwed into the junction box fitting hole 404 in the fireproof junction box, while the screw head 403 may be countersunk into the brim portion 101, thereby using the fasteners 401 to fix the light housing 10 onto the junction box 40. Lastly, as shown in FIGS. 2C and 2D, the trim plate 30 may be installed. In some embodiments, the light housing 10 is configured to receive the trim plate 30. As a result, the trim plate 30 may simultaneously cover the light housing fitting holes 103 and screw heads 403 for fixed connection with the junction box thereon, and achieve the effect of hiding the light housing fitting holes 103 and screw heads 403.

Figure 2G:
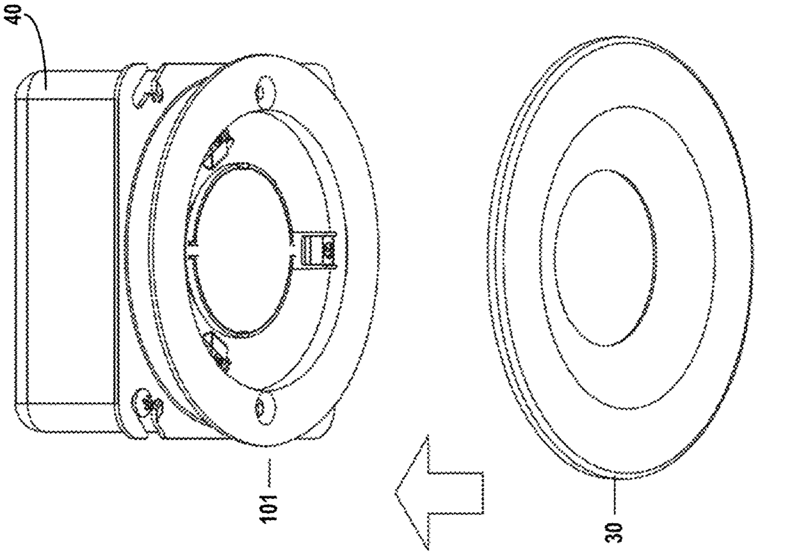
Figure 2F:
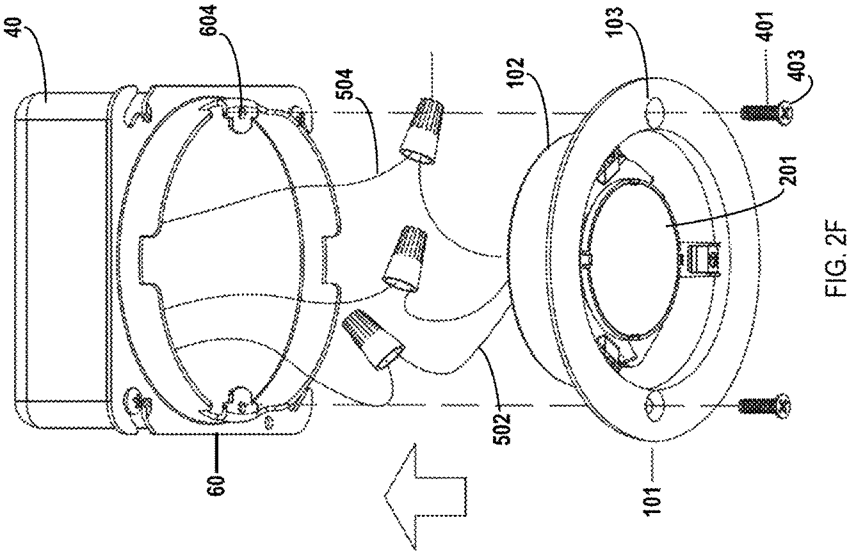
Figure 2E:
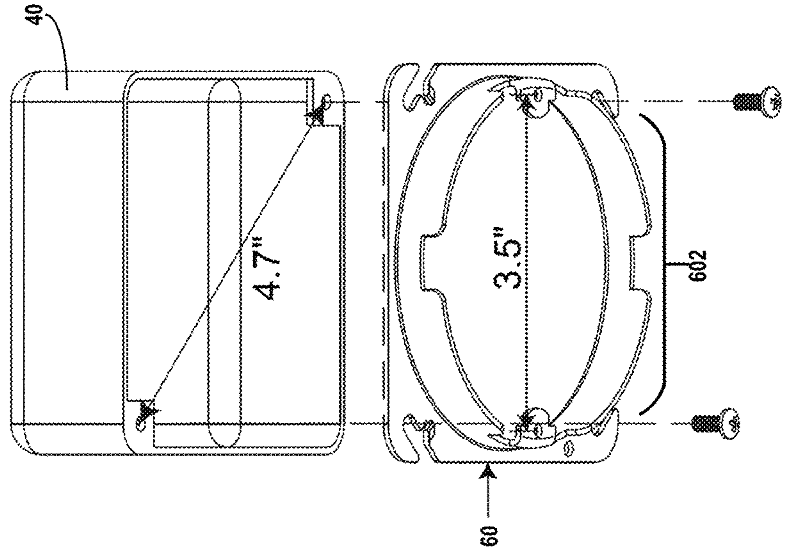
Figure 2I:
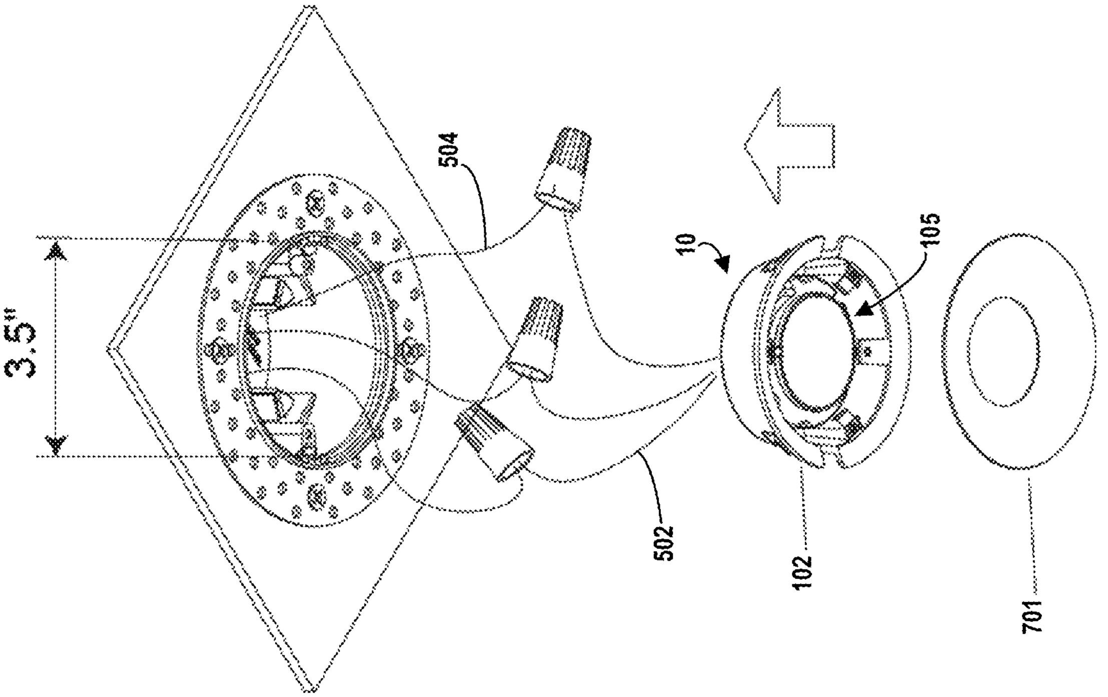
Figure 2H:
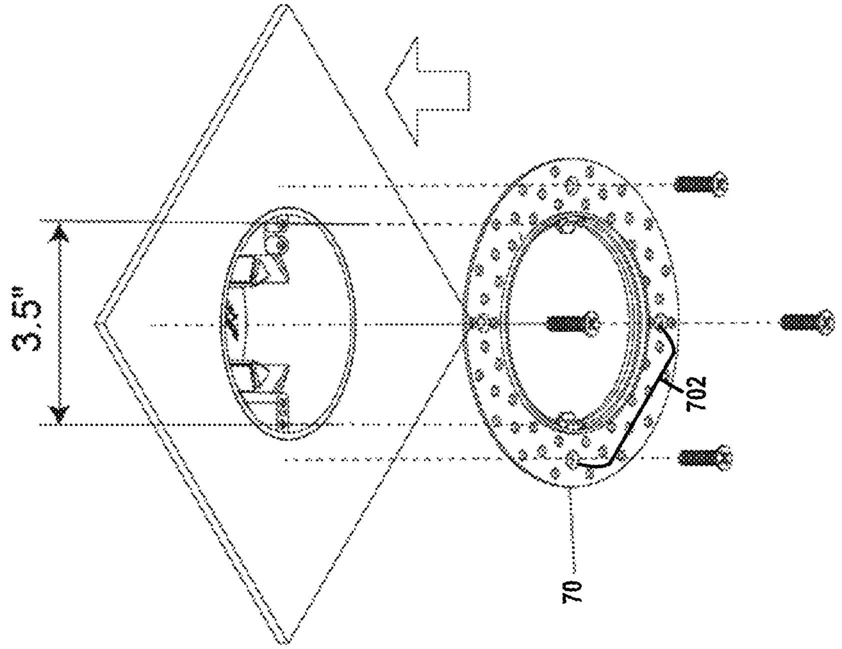

With reference to FIGS. 2E, 2F, and 2G, for installations of the downlight 50 requiring Chicago plenum applications, an accessory mounting plate 60 may include hole spacing 602 to match a 4-0 junction box (e.g., junction box 40). As shown in FIG. 2F, electric wires 502 of the light emitting member 201 may be connected with electric wires 504 in the junction box 40. Then, as shown in FIG. 2G, the hat body portion 102 of the light housing may be placed into the junction box 40. Fitting holes 103 of the brim portion 101 may respectively correspond to or align with the position of fitting holes in the junction box. In embodiments that employ screws for fasteners 401, each accessory mounting plate fitting hole 604 may receive one screw 401, and the rod of each screw may run through the fitting hole 103. Fasteners 401 (screws) may be screwed into the accessory mounting plate fitting hole 604 in the junction box 40, while the screw head 403 may be countersunk into the brim portion 101, thereby using the fasteners 401 to fix the light housing 10 onto the junction box 40. With reference to FIG. 2G, the trim plate 30 may be installed. In some embodiments, the light housing 10 is configured to receive the trim plate 30. As a result, the trim plate 30 may simultaneously cover the light housing fitting holes 103 and screw heads 403 for fixed connection with the junction box thereon, and achieve the effect of hiding the light housing fitting holes 103 and screw heads 403.

As shown in FIGS. 21 and 2J, a mud ring 70 may be employed in trim-less installations. A mud ring 70 may include hole spacing 702 to match a 4-0 junction box (e.g., junction box 40). As shown in FIG. 2J, electric wires 502 of the light emitting member 201 may be connected with electric wires 504 in the junction box 40. Then, as shown in FIG. 2J, the hat body portion 102 of the light housing may be placed into the junction box 40 and the trim plate 30 may be installed. The light housing 10 is also configured to receive the trim plate 701. As a result, the trim plate 701 may cover internal components 105, and, with the finished installation of the mud ring 70 achieve the effect of hiding the internal components 105 and the light housing 10. The mud ring 70 may also be employed in trim-less installations requiring the accessory mounting plate 60.

The trim plate 30 may be a variety of shapes. For example, as shown in FIG. 3, the trim plate 30 may be round, and, as shown in FIG. 22, the trim plate 30 may also be square.

A plurality of springs 505 distributed circumferentially at an interval around the center of the hat body portion 102 are provided inside the hat body portion 102. One end of each spring 505 is secured inside the hat body portion 102, and the other end of each spring 505 extends towards the center of the hat body portion 102 to form a free end 501. The trim plate 30 is provided with an annular portion 301 (FIG. 10) placed inside the hat body portion 102. The free end 501 of each spring presses against the annular portion 301 to urge the trim plate 30 toward the light housing 10, and to prevent the trim plate 30 from becoming disengaged from the light housing 10. In the present embodiments, the trim plate is installed to the light housing in a removable manner by means of the cooperation between the springs 505 and the annular portion 301.

The external side surface of the annular portion 301 is provided with an annular groove 302 extending along the circumference of the annular portion 301. To affix the trim plate 30 to the hat body portion, the free end 501 of each spring is snapped into the annular groove 302 when being placed into the hat body portion 102 at the annular portion 301.

As shown in FIG. 11 through FIG. 21, the light engine housing 20 comprises a light-emitting member 201, a lampshade 204, and a light distribution member 213. The light-emitting member 201 comprises a circuit board 202 and an LED chip array 203 provided on the circuit board 202. The lampshade 204 comprises a circumferential wall 205, an end wall 206, and a reflective cup 207. The circumferential wall 205 has a first end 208 and a second end 209 opposing each other. The first end 208 of the circumferential wall is open to form a port 210, the circuit board 202 of the light-emitting member is mounted at the first end 208 of the circumferential wall and covers the port 210, while the LED chip array 203 on the circuit board 202 are located in the circumferential wall 205. The reflective cup 207 is trumpet-shaped and comprises a small-diameter end 211 and a large-diameter end 212. Both the small-diameter end 211 and the large-diameter end 212 are open, wherein, the small-diameter end 211 is placed in the circumferential wall 205 via the second end 209 of the circumferential wall and reaches the circuit board 202. The LED chip array 203 on the circuit board enter the reflective cup 207 via the small-diameter end 211. The end wall 206 is connected between the second end 209 of the circumferential wall and the external side surface of the reflective cup 207 to cover the gap between the second end 209 of the circumferential wall and the external side surface of the reflective cup 207. The circumferential wall 205, the end wall 206, and the reflective cup 207 are integrally formed, for example, integrally formed through injection molding. The light distribution member 213 is mounted to the large-diameter end 212 of the reflective cup in a removable manner.

The lampshade 204 is fixedly installed in the hat body portion 102. The lampshade comprising the reflective cup according to the design of the technical solution is formed integrally, which avoids assembly and can achieve a better effect of enclosure to keep dust and insects away and prevent light leakage, and at the same time, the use of the circuit board to cover the port can achieve the effect of enclosure to keep dust and insects away and prevent light leakage. In addition, the light distribution member is removable, which facilitates the replacement of different light distribution members according to different use requirements, and improves the flexibility and adaptability of the use.

The large-diameter end 212 of the reflective cup is provided with a step surface 214 extending along the edge of the large-diameter end to be ring-shaped. The light distribution member 213 sits on the step surface 214 and is supported by the step surface 214. The technical solution facilitates installation and support of the light distribution member by providing the step surface.

The large-diameter end 212 of the reflective cup is also provided with a buckle structure for fastening the light distribution member 213, thereby realizing the installation of the light distribution member at the large-diameter end of the reflective cup in a removable manner. The technical solution facilitates installation and dismantling of the light distribution member by adopting the buckle structure.

The buckle structure comprises a plurality of inverted hooks 215 distributed at an interval along the circumference of the step surface 214. The technical solution can facilitate stable and reliable installation of the light distribution member at the large-diameter end of the reflective cup. All the hooks 215 are located at the outer side of the step surface 214. The technical solution facilitates installation and dismantling of the light distribution member.

The light distribution member 30 is a lens or a translucent panel. In some embodiments, the light distribution member 30 is made of acrylic. In the present embodiment, the light distribution member 213 shown in FIG. 1 through FIG. 19 is a Polymethyl-Methacrylate (PMMA) acrylic panel cut to the size of the opening where it sits on stepped surface 214 and is secured by hooks 215.

FIGURES LEGEND

100—ceiling
10—light housing
101—brim portion
102—hat body portion
103—light housing fitting hole
20—light engine housing
201—light-emitting member
202—circuit board
203—LED chip array
204—lampshade
205—circumferential wall
206—end wall
207—reflective cup
208—first end of the circumferential wall
209—second end of the circumferential wall
210—port
211—small-diameter end
212—large-diameter end
213—light distribution member
214—step surface
215—hooks
216—lens flange
30—trim plate
301—annular portion
302—annular groove
40—junction box
401—screw
402—rod of the screw
403—screw head
404—junction box fitting hole
505—spring
501—free end of a spring

The invention claimed is:

1. A self-contained LED downlight suitable for installation in a junction box, the self-contained LED downlight comprising:
- a light housing;
- a light engine housing including a light-emitting member, a lampshade, and a light distribution member, the light-emitting member including a circuit board with an LED chip array, wherein:
  - the lampshade comprises a circumferential wall, an end wall, and a reflective cup:
  - the circumferential wall has a first end and a second end opposing each other:
  - the first end of the circumferential wall is open to form a port, where the circuit board of the light-emitting member is mounted at the first end of the circumferential wall and covers the port, while the LED chip array on the circuit board is located within the circumferential wall;
  - the reflective cup is trumpet-shaped and comprises a small-diameter end and a large-diameter end, and both the small-diameter end and the large-diameter end are open, wherein the small-diameter end is placed within the circumferential wall via the second end of the circumferential wall and reaches the circuit board, and the LED chip array on the circuit board enters the reflective cup via the small-diameter end;
  - the end wall is connected between the second end of the circumferential wall and the external side surface of the reflective cup to cover a gap between the second end of the circumferential wall and the external side surface of the reflective cup;
  - the circumferential wall, the end wall, and the reflective cup are integrally formed;
  - the light distribution member is mounted to the large-diameter end of the reflective cup in a removable manner; and
- a trim plate;

wherein:
- the light housing is of a hat shape and comprises a brim portion and a hat body portion, the light engine housing being disposed inside the hat body portion, the hat body portion including a plurality of springs distributed circumferentially at an interval around the center of the hat body portion, where one end of each spring is secured inside the hat body portion and the other end of each spring extends towards the center of the hat body portion to form a free end;

the brim portion is provided with fitting holes sized to receive one or more fixing members for connection with the junction box;

the trim plate is installed to the light housing in a removable manner, and wherein the trim plate covers the brim portion to shield the fitting holes and is provided with an annular portion inside the hat body portion;

the external side surface of the annular portion is provided with an annular groove extending along the circumference of the annular portion and the free end of each spring is snapped into the annular groove when being placed into the hat body portion and presses against the annular portion to prevent the cover from becoming disengaged from the light housing;

the light-emitting member includes one or more electric wires configured to connect directly to one or more electric wires in the junction box so as to provide power to the LED chip array; and the lampshade is fixedly installed in the hat body portion.

2. The LED downlight suitable for installation in a junction box according to claim 1, wherein: the external side surface of the annular portion is provided with an annular groove extending along the circumference of the annular portion; and the free end of each spring is snapped into the annular groove when being placed into the hat body portion at the annular portion.

3. The LED downlight suitable for installation in a junction box according to claim 1, wherein:

the large-diameter end of the reflective cup is provided with a step surface extending along the edge of the large-diameter end to be ring-shaped; and the light distribution member sits on the step surface and is supported by the step surface.

4. The LED downlight suitable for installation in a junction box according to claim 3, wherein: the large-diameter end of the reflective cup is provided with a buckle structure for fastening the light distribution member.

5. The LED downlight suitable for installation in a junction box according to claim 4, wherein: the buckle structure comprises a plurality of inverted hooks distributed at an interval along the circumference of the step surface.

6. The LED downlight suitable for installation in a junction box according to claim 1, wherein the light engine housing includes a reflective cup having a small-diameter end and a large-diameter end, the small-diameter end disposed adjacent the circuit board, and the light distribution member being removably mounted at the large-diameter end of the reflective cup.

7. The LED downlight suitable for installation in a junction box according to claim 1, wherein: the junction box is installed in a ceiling and the light distribution member is configured to be recessed from a plane defined by the ceiling when the LED downlight is installed within the junction box.

* * * * *